(12) United States Patent
Sin

(10) Patent No.: US 10,339,815 B1
(45) Date of Patent: Jul. 2, 2019

(54) APPARATUS AND METHOD FOR CONTROLLING LAMP OF PLATOONING VEHICLE

(71) Applicants: Hyundai Motor Company, Seoul (KR); Kia Motors Corporation, Seoul (KR)

(72) Inventor: Geun Ok Sin, Janggye-myeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/007,082

(22) Filed: Jun. 13, 2018

(30) Foreign Application Priority Data

Dec. 29, 2017 (KR) .................. 10-2017-0183892

(51) Int. Cl.
  *G05D 1/02* (2006.01)
  *G08G 1/00* (2006.01)
  *B60Q 1/34* (2006.01)

(52) U.S. Cl.
  CPC ............. *G08G 1/22* (2013.01); *B60Q 1/346* (2013.01); *G05D 1/0293* (2013.01); *G05D 1/0295* (2013.01); *G05D 2201/0213* (2013.01)

(58) Field of Classification Search
  CPC ............. G08G 1/22; G05D 2201/0213; G05D 1/0293; G05D 1/0295
  USPC ........................................................ 340/468
  See application file for complete search history.

(56) References Cited

U.S. PATENT DOCUMENTS

| 5,777,451 | A  | * | 7/1998  | Kobayashi | G08G 1/22 |
|-----------|----|---|---------|-----------|-----------|
|           |    |   |         |           | 180/169   |
| 6,121,896 | A  |   | 9/2000  | Rahman    |           |
| 6,765,495 | B1 | * | 7/2004  | Dunning   | G08G 1/161|
|           |    |   |         |           | 340/435   |
| 7,355,347 | B1 | * | 4/2008  | Bell      | B60Q 1/143|
|           |    |   |         |           | 307/10.8  |
| 7,365,769 | B1 | * | 4/2008  | Mager     | B60Q 1/44 |
|           |    |   |         |           | 340/467   |
| 9,645,579 | B2 |   | 5/2017  | Switkes et al. |      |
| 9,852,554 | B2 | * | 12/2017 | Nix       | G07C 5/008|
| 10,040,390| B2 | * | 8/2018  | Dudar     | B60Q 1/085|
| 10,089,882| B2 | * | 10/2018 | Pandy     | B60W 10/04|
| 2018/0113476 | A1 | * | 4/2018 | Giles   | B60W 10/04|

FOREIGN PATENT DOCUMENTS

| EP | 3053156 A1 | 8/2016 |
| JP | 2000-293791 A | 10/2000 |
| JP | 2000-293799 A | 10/2000 |
| JP | 2014-130409 A | 7/2014 |
| WO | WO 2015/047182 A1 | 4/2015 |

* cited by examiner

*Primary Examiner* — John A Tweel, Jr.
(74) *Attorney, Agent, or Firm* — Morgan, Lewis & Bockius LLP

(57) ABSTRACT

An apparatus configured for controlling lamps of platooning vehicles including a leading vehicle and a plurality of following vehicles, may include a memory configured to store information related to the following vehicles; and a controller configured to collectively control lamps of the leading vehicle and following vehicles in a response to events occurring in the leading vehicle and following vehicles.

20 Claims, 14 Drawing Sheets

APPARATUS AND METHOD FOR CONTROLLING LAMP OF PLATOONING VEHICLE

CROSS-REFERENCE TO RELATED APPLICATION

The present application claims priority to Korean Patent Application No. 10-2017-0183892, filed on Dec. 29, 2017, the entire contents of which is incorporated herein for all purposes by this reference.

BACKGROUND OF THE INVENTION

Field of the Invention

The present invention relates to an apparatus and method for controlling a lamp of a platooning vehicle, and more particularly to a technology of collectively controlling a lamp of each vehicle during platooning corresponding to a traveling situation.

Description of Related Art

In general, in the situation where several vehicles travel to one destination at the same time, when the majority of drivers do not know the route to the destination and one driver knows the route, it is desired to travel through a specific route among various routes to the destination because there is a driver who knows a shortcut route through a side road, the vehicles move to a good place without a specific destination, or the vehicles pass through an undecided stop such as a resting place, platooning is performed to prevent the companion vehicles from being separated from each other.

The platooning allows several vehicles to travel together while maintaining a minimum safety distance. When the platooning is performed, the air resistance of the following vehicles may be reduced to improve fuel economy, the risk of accidents may be reduced, the convenience for each driver of the vehicle may be improved, and the distance between the vehicles may be reduced so that the number of vehicle using the road is increased by 3 to 5 times.

In recent years, there has been developed a technique that enables each vehicle to perform platooning in a state where a driver rides only a leading vehicle.

According to a conventional technique for controlling a lamp of a platooning vehicle, the turn signal of a following vehicle is controlled in a response to the turn signal generated from a leading vehicle. In addition, the type of the lamps is limited and the lamps are controlled only in consideration of an event of the leading vehicle, but the lamps are not collectively controlled in accordance with various events (such as platoon deviation, platoon participation, order change, and the like) occurring in following vehicles.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus configured for controlling a lamp of a platooning vehicle which is configured for allowing drivers of surrounding vehicles to effectively recognize all events that may occur during platooning by collectively controlling lamps of leading and following vehicles corresponding to various events occurring in the following vehicle during platooning, and a method thereof.

The technical objects of the present invention are not limited to the above-mentioned one, and the other unmentioned technical objects and advantages will become apparent from the following description. Also, it may be easily understood that the objects and advantages of the present invention may be realized by the units and combinations thereof recited in the claims.

In accordance with one aspect of the present invention, there is provided an apparatus configured for controlling lamps of platooning vehicles including a leading vehicle and a plurality of following vehicles, which may include a memory configured to store information related to the following vehicles; and a controller configured to collectively control lamps of the leading vehicle and following vehicles in a response to events occurring in the leading vehicle and following vehicles. In the instant case, each of the platooning vehicles may include a front turn signal lamp, a rear turn signal lamp and a plurality of side marker lamps.

The controller may activate the turn signal lamps and side marker lamps of the leading vehicle and the turn signal lamps and marker side lamps of each of the following vehicle in a response to a turn signal ON command generated in the leading vehicle, and may control such that the lamps flicker synchronously. In the instant case, the controller may synchronize a flicker of a left turn signal lamp with a flicker of a left marker lamp of the leading vehicle when the turn signal ON command is a left turn signal ON command and may synchronize a flicker of a right turn signal lamp with a flicker of a right marker lamp of the leading vehicle when the turn signal ON command is a right turn signal ON command.

Furthermore, the controller may activate a turn signal lamp and a plurality of side marker lamps of a rearmost following vehicle in a platooning queue when a new vehicle participates in the platooning queue at rear of the platooning queue. In the instant case, the controller may activate a left turn signal lamp and a left marker lamp of the rearmost following vehicle when the new vehicle enters from a left side of the platooning queue, and may activate a right turn signal lamp and a right marker lamp of the rearmost following vehicle when the new vehicle enters from a right side of the platooning queue.

Furthermore, the controller may activate a turn signal lamp and a plurality of side marker lamps of a vehicle preceding a new vehicle and a turn signal lamp and a plurality of side marker lamps of a rearmost following vehicle in a platooning queue when the new vehicle participates in the platooning queue at a middle of the platooning queue. In the instant case, the controller may activate a left turn signal lamp and a left marker lamp of the preceding vehicle and all lamps of the rearmost following vehicle when the new vehicle enters from a left side of the platooning queue, and may activate a right turn signal lamp and a right marker lamp of the preceding vehicle and all the lamps of the rearmost following vehicle when the new vehicle enters from a right side of the platooning queue.

The controller may activate a turn signal lamp and a plurality of side marker lamps of a vehicle adjacent to a following vehicle platooning in a platooning queue when the following vehicle leaves the platooning queue. In the instant case, the controller may activate a left turn signal lamp and a left maker lamp of the adjacent vehicle when the following vehicle leaves the platooning queue to a left side of the platooning queue, and may activate a right turn signal lamp and a right maker lamp of the adjacent vehicle when the following vehicle leaves the platooning queue to a right side of the platooning queue. Furthermore, the controller may set a lamp flickering period of the adjacent vehicle to be longer than a lamp flickering period of the following vehicle.

Furthermore, the controller may activate all lamps of a vehicle adjacent to an external vehicle which is not normally authenticated when the external vehicle attempts to enter a platooning queue. In the instant case, the controller may be configured to control such that the adjacent vehicle sounds a horn.

Furthermore, the controller may activate all lamps of a vehicle adjacent to a following vehicle while the following vehicle leaves a platooning queue and activates all lamps of the following vehicle and a rearmost following vehicle in a platooning queue while the following enters the platooning queue when the following vehicle is to change an order in a platooning queue.

Furthermore, the controller may activate the turn signal lamp of the leading vehicle and the turn signal lamp of each following vehicle and may control such that the side marker lamp of the leading vehicle and the side marker lamp of each following vehicle flicker alternately when informing of release of platooning.

In accordance with another aspect of the present invention, there is provided a method of a method of controlling lamps of platooning vehicles including a leading vehicle and a plurality of following vehicles, which may include storing information related to the following vehicles; and collectively controlling lamps of the leading vehicle and following vehicles in a response to events occurring in the leading vehicle and following vehicles.

In the instant case, the controlling of the lamps of the leading vehicle and following vehicles may include activating the turn signal lamps and side marker lamps of the leading vehicle and the turn signal lamps and marker side lamps of each of the following vehicle in a response to a turn signal ON command generated in the leading vehicle, and controlling such that the lamps flicker synchronously.

Furthermore, the controlling of the lamps of the leading vehicle and following vehicles may include activating a turn signal lamp and a plurality of side marker lamps of a rearmost following vehicle in a platooning queue when a new vehicle participates in the platooning queue at rear of the platooning queue.

Furthermore, the controlling of the lamps of the leading vehicle and following vehicles may include activating a turn signal lamp and a plurality of side marker lamps of a vehicle preceding a new vehicle and a turn signal lamp and a plurality of side marker lamps of a rearmost following vehicle in a platooning queue when the new vehicle participates in the platooning queue at a middle of the platooning queue.

Furthermore, the controlling of the lamps of the leading vehicle and following vehicles may include activating a turn signal lamp and a plurality of side marker lamps of a vehicle adjacent to a following vehicle platooning in a platooning queue when the following vehicle leaves the platooning queue.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
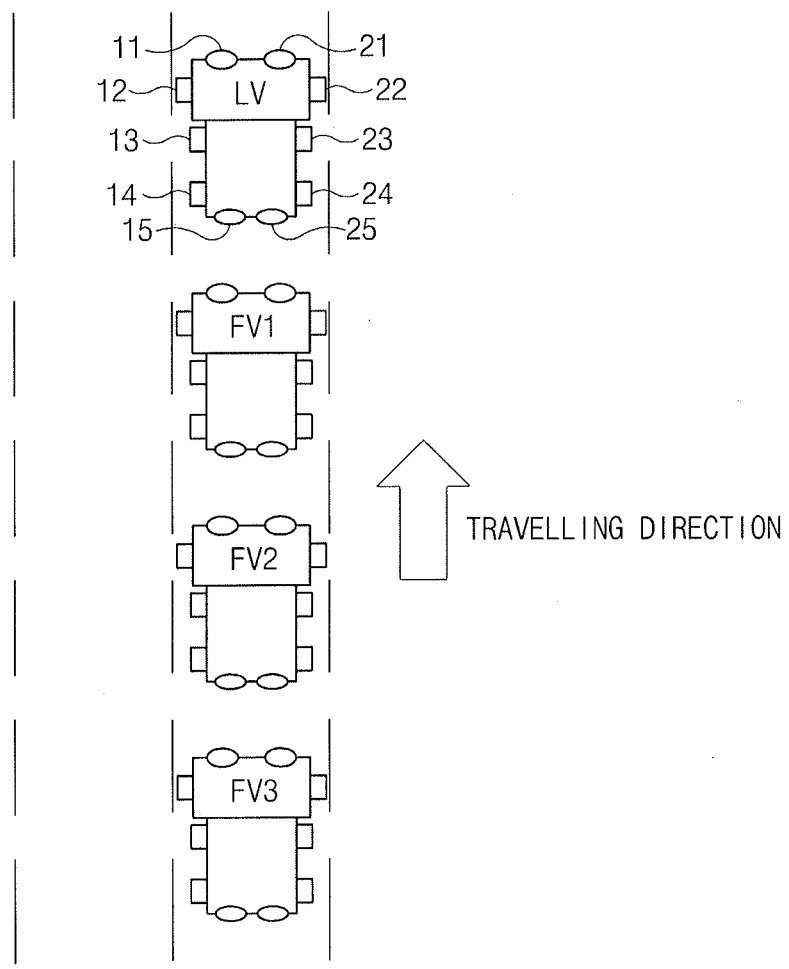
FIG. 1 is a diagram illustrating each platooning vehicle to which an exemplary embodiment of the present invention is applied.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described more specifically with reference to the accompanying drawings. Throughout the specification, it is noted that the same or like reference numerals denote the same or like components even though they are provided in different drawings. Furthermore, in the following description of the present invention, a detailed description of known functions and configurations incorporated herein will be omitted when it may make the subject matter of the present invention rather unclear.

Furthermore, terms, such as first, second, A, B, (a), (b) or the like may be used herein when describing components of the present invention. The terms are provided only to distinguish the elements from other elements, and the essences, sequences, orders, and numbers of the elements are not limited by the terms. Furthermore, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

FIG. 1 is a diagram illustrating each platooning vehicle to which an exemplary embodiment of the present invention is applied, where trucks are illustrated as one example, but the exemplary embodiment is not limited thereto.

As illustrated in FIG. 1, a plurality of vehicles is in a platooning state where the vehicles travel in a platoon while maintaining a constant interval. In the instant case, a vehicle travelling at the head is referred to as a leading vehicle LV, and a vehicle following the leading vehicle is referred to as a following vehicle FV. Furthermore, each following vehicle is denoted as FV1, FV2 and FV3 according to the order (position) in the platooning queue.

Since each vehicle has the same structure, the structure of the leading vehicle LV will be referred to as a representative.

The leading vehicle LV includes a left front turn signal lamp 11, left first to third marker lamps 12 to 14, and a left rear turn signal lamp 15. In the instant case, the left front turn signal lamp 11 may be implemented with a left lamp module including a left head lamp.

Furthermore, the leading vehicle LV includes a right front turn signal lamp 21, right first to third marker lamps 22 to 24, and a right rear turn signal lamp 25. In the instant case, the right front turn signal lamp 21 may be implemented with a right lamp module including a right head lamp.

Figure 2:
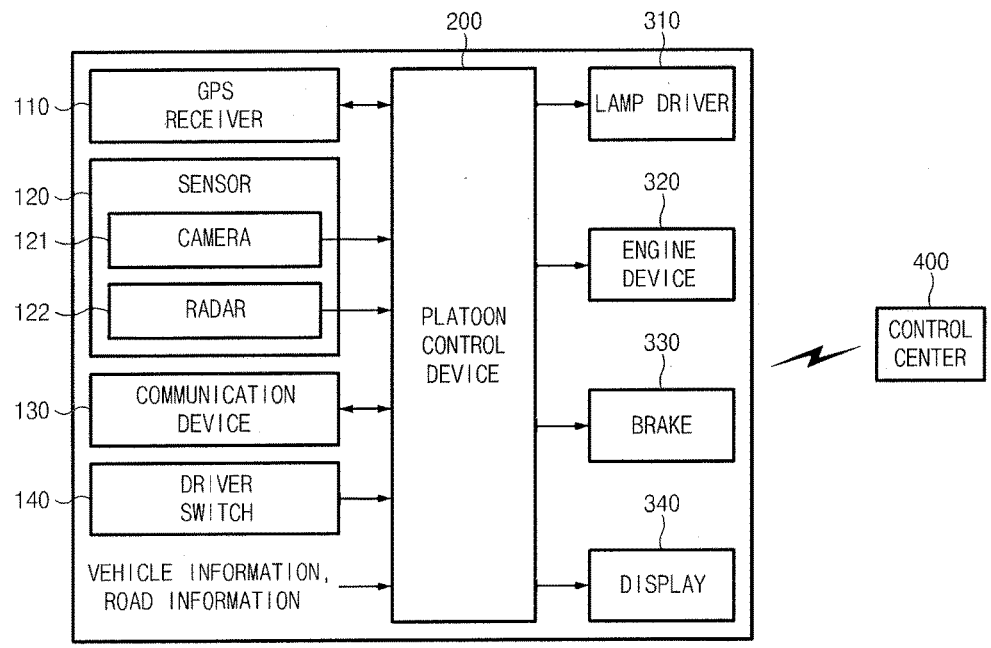
FIG. 2 is a block diagram illustrating a system for controlling platooning, which is used for an exemplary embodiment of the present invention.

Furthermore, the leading vehicle LV and the following vehicle FV may include a platoon control system. As an example, the configuration of the platoon control system is illustrated in FIG. 2.

The platoon control system may include a Global Positioning System (GPS) receiver 110, a sensor 120, a communication device 130, a driver switch 140, a platoon control device 200, a lamp driver 310, an engine device 320, a brake 330, and a display 340. The platoon control system may transmit/receive weather forecast information and platoon information to/from a control center 400.

The GPS receiver 110 receives GPS information and provides the GPS information to the platoon control device 200 so that the platoon control device 200 may get a position of a host vehicle.

The sensor 120 may detect a road condition in front of the vehicle and a weather condition and includes a camera 121 and a radar 122. Since there is a high possibility that an error is disposed in image data of the camera 21 when it is raining or snowing, the camera 121 may be turned off and the sensor 120 may determine the road condition and the weather condition by use of only data of the radar 122 under control of the platoon control device 200. Furthermore, the sensor 120 obtains information related to a relative distance between vehicles, a relative speed, a lane and the like, and provides the same to the platoon control device 200.

The communication device 130 may perform vehicle-to-vehicle (V2V) communication and may transmit/receive platooning information, weather forecast information to/from the control center 400.

The driver switch 140 is a module for inputting a platoon request and acceptance when a driver is requested to consent to platooning such as a platooning level, a platooning order, and the like from the leading vehicle or the control center 400, the driver turns on/off the driver switch 140 to provide his opinion. When the driver switch 140 is turned on, it may be determined that the platooning is accepted.

Furthermore, information related to a load box, a map and a traffic situation may be input to the platoon control device 200.

When the lamp driver 310 receives a lamp driving command for platoon control from the platoon control device 200, the lamp driver 310 drives the vehicle lamps. That is, the lamp driver 310 may drive a lamp corresponding to a turn signal, a stop signal, a platoon mode signal, or the like.

When the engine device 320 receives an acceleration command from the platoon control device 200, the engine device 320 performs acceleration of the vehicle.

When the brake 330 receives a deceleration command from the platoon control device 200, the brake 330 performs deceleration of the vehicle.

The display 340 may display platoon status information such as platoon creation information, lead vehicle information, headway distance information, and the like, and may include a cluster, a head-up display, a navigation terminal, audio visual navigation (AVN) system, and the like. Although a configuration of displaying the platoon status information on the display 340 configured separately from the platoon control device 200 is illustrated in FIG. 2, the exemplary embodiment is not limited thereto and a display may be provided in the platoon control device 200 such that the platoon status information is displayed thereon.

The display 340 may include at least one of a liquid crystal display (LCD), a thin film transistor liquid crystal display (TFT LCD), a light emitting diode (LED), an organic light emitting diode (OLED), an active matrix OLED (AMOLED), a flexible display, a bent display, and a three-dimensional (3D) display. Some of the displays may be implemented as a transparent display which is transparent or optically transparent to see an outside.

The platoon control device 200 may determine the weather environment state based on the weather forecast information received from the control center or the weather information detected by the sensor, and may determine the platooning level based on the weather environment state to control the platooning.

Figure 3:
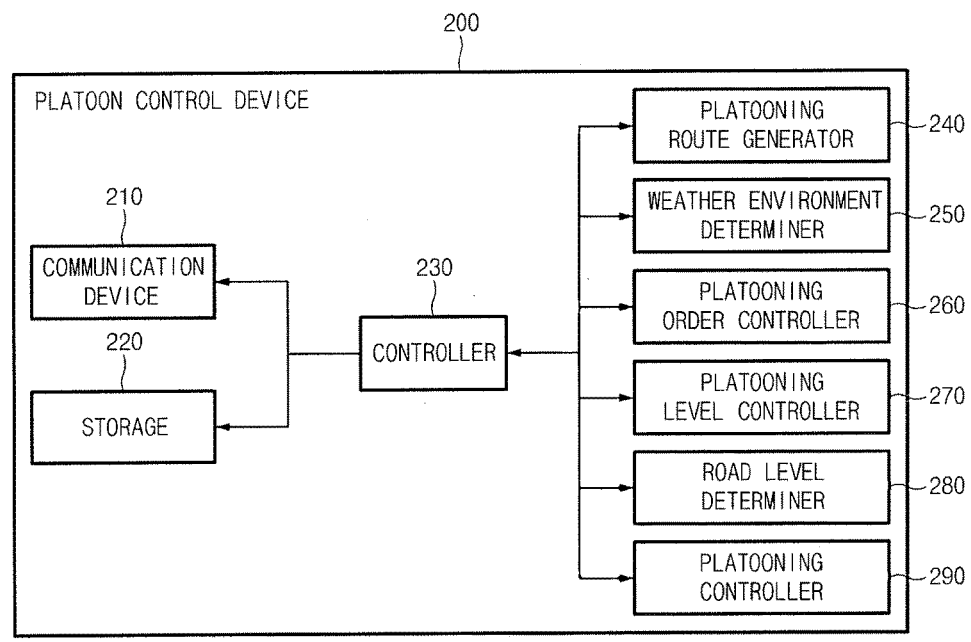
FIG. 3 is a block diagram illustrating a platoon control device according to an exemplary embodiment of the present invention.

As illustrated in FIG. 3, the platoon control device 200 may include a communication device 210, a storage 220, a controller 230, a platooning route generator 240, a weather environment determiner 250, a platooning order controller 260, a platooning level controller 270, a road level determiner 280, and a platooning controller 290.

The communication device 210 performs CAN-communication with devices in a vehicle.

The storage 220 stores information transmitted/received through communication between vehicles and information generated in the platooning control device 200. The storage 220 may include at least one type of a storage medium among memories of a flash memory type, a hard disk type, a solid state disk type, a silicon disk drive type, a multimedia card micro type and a card-type (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The controller 230 controls the overall operation of each component of the platoon control device 200.

The platooning route generator 240 generates a platooning route including a platoon starting point, a joining point, and a destination when configuring the platooning.

The weather environment determiner 250 determines a weather environment on a platooning route. That is, the weather environment determiner 250 may receive weather forecast information from the control center 400 or obtain weather information by use of a measurement result of the sensor 120 of the vehicle to determine the weather environment state and the road state (road surface state) accordingly. For example, when it is determined based on the weather forecast information that it will rain or snow on the platooning route for the platooning time period, the weather environment determiner 250 may determine that the weather environment is bad.

The platooning order controller 260 determines a platooning order based on the weather environment state. That is, when the weather environment is in a normal condition, the platooning order controller 260 may determine the platooning order by complexly accounting for at least one of a load weight, a platooning route, fuel efficiency, and braking power. For example, a vehicle with weak braking power, poor fuel efficiency and a heavy load may be selected as the leading vehicle, and a vehicle with strong braking power, good fuel efficiency and a low load may be placed in the rear because the vehicle may rapidly response to emergency braking.

Meanwhile, when the weather environment is bad due to snow and rain, the platooning order controller 260 may determine the platooning order based on the braking power. That is, when the weather environment is in a bad condition, the platooning order controller 260 selects the vehicle having the weakest braking power as the leading vehicle, and selects the vehicle having the next weak braking power as the first following vehicle immediately following the leading vehicle. The order of the remaining following vehicles thereafter is determined in order of weak braking power. In other words, since the braking distance may be longer when the road surface is wet due to snow, rain, or the like, when the vehicle having a weak braking power is positioned at the rear, the braking may not be performed on time so that the vehicle may collide with a preceding vehicle. Thus, when the weather environment is in a bad condition, the vehicle having good braking power is placed at the rearmost position.

The platooning level controller 270 determines a platooning level. In the instant case, the platooning level may be determined by use of various schemes accounting for general various conditions such as the number of platooning vehicles, a cargo weight of a platooning vehicle, a platooning route distance, road construction and the like. For example, the platooning level may be classified into a first level (Lv.1) at which the platooning is not performed, a second level (Lv.2) at which only the longitudinal distance between vehicle is controlled during platooning, and a third level (Lv.3) at which the longitudinal and transversal distances between vehicles and the steering are controlled. That is, the platooning level controller 270 may determine the platooning level as the first level in a situation where it is impossible to perform platooning (in case where the weather deterioration is very serious), the second level in a situation where, although it is possible to perform the platooning, it may be dangerous to perform a traversal control so that it is possible to perform the longitudinal control in platoon following control, or the third level in a situation where the weather environment is good so that it is possible to perform all controls related to the platooning.

The platooning level controller 270 may determine the platooning level based on a road level determined by the road level determiner 280. For example, when the road level is the first level, the longitudinal distance between vehicles is controlled to be 10 m. When the road level is the second level, the longitudinal distance between vehicles is controlled to be 15 m. When the road level is the third level, the longitudinal distance between vehicles is controlled to be 20 m. This means that as the road level is increased, the road condition becomes worse due to poor weather conditions. When the road level is the third level, since the road condition is very bad (wet road surface), the distance between vehicles is controlled to be 20 m which is the longest.

The road level determiner 280 determines the lane state and the road level based on the weather information and the road information measured by the sensor 120. In the instant case, the road level determiner 280 may recognize the lane state from the image data of the camera. The road level determiner 280 may determine the road level by use of at least one of snow and rain detecting results of the vehicle sensor (sensor device), a slip rate of an electronic stability control (ESC), and the lane state of the road. Furthermore, the road level determiner 280 may determine the lane state of the road on the platooning route when the platooning level is the third level.

The platooning controller 290 controls the platooning level determined by the platooning level controller 270. In the instant case, the platooning control means the control of the speed of the vehicle, the longitudinal distance between vehicles, the transversal distance between vehicles, and the like. When the platooning level is the first level, the platooning controller 290 does not perform the platooning. When the platooning level is the second level, the platooning controller 290 performs the longitudinal control. When the platooning level is the third level, the platooning controller 290 performs the longitudinal and transversal controls and the steering control.

Furthermore, the platooning controller 290 controls the longitudinal and transversal distances between vehicles based on the lane state and road level determining results of the road level determiner 280 as well as the platooning level. That is, the platooning controller 290 performs independent control for maintaining the travelling in the lane independently of the behavior of the leading vehicle when the lane state is good (above the first reference value). When the lane state is bad (less than the first reference value), the platooning controller 290 controls the lead vehicle (LV) following control that allows the following vehicle to follow the leading vehicle. In the instant case, the following vehicle may follow the route, speed, and the like of the leading vehicle through the radar 122 which is less affected by the LV following lane and the weather environment.

When the road level is good (more than the second reference value), the platooning controller 290 determines the longitudinal distance between vehicles as the first distance value (e.g., 10 m). When the road level is bad (less than the second reference value), the platooning controller 290 determines the longitudinal distance between vehicles as the second distance value (e.g., 20 m) which is greater than the first distance value. Thus, when the road level is poor, the platooning controller 290 may increase the longitudinal distance between vehicles to secure safety in emergency braking. The platooning controller 290 may turn off the camera on the front or side of the vehicle when the platooning level is the second level at which only the longitudinal control is performed or when the road level is bad (less than the second reference value). In other words, when the platooning level is the second level and the road level is bad, since the camera 122 may misrecognize a front object and may be negatively influenced, the platooning controller 290 turns off the camera 122 to save the battery power.

Figure 4:
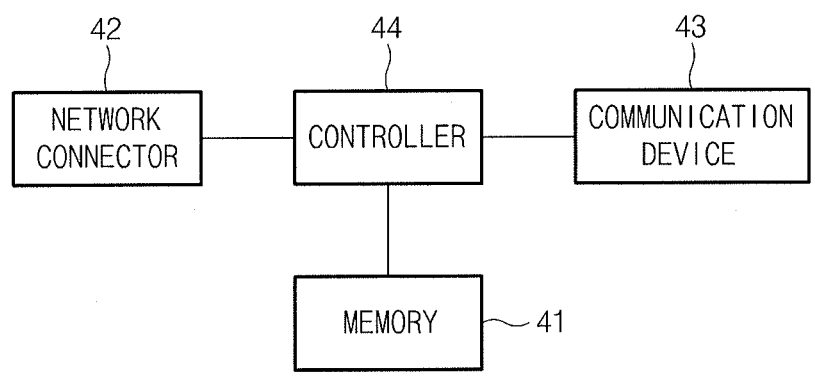
FIG. 4 is a view illustrating an apparatus configured for controlling a lamp of a platooning vehicle according to an exemplary embodiment of the present invention.

FIG. 4 is a view illustrating an apparatus configured for controlling a lamp of a platooning vehicle according to an exemplary embodiment of the present invention.

As illustrated in FIG. 4, an apparatus configured for controlling a lamp of a platooning vehicle according to an exemplary embodiment of the present invention may include a memory 41, a network connector 42, a communication device 43, and a controller 44. According to the manner of implementing an exemplary embodiment of the present invention, elements may be combined with each other to be formed as a single device, and some elements may be omitted depending on the manner of implement an exemplary embodiment of the present invention.

Describing each element, the memory 41 stores information related to the platooning vehicles (such as identification information related to each vehicle, platooning order information, position information related to each vehicle, authentication information, and the like). Furthermore, the memory 41 may include various programs used for collectively controlling lamps of platooning vehicles.

The memory 41 may include at least one type of a storage medium among memories of a flash memory type, a hard disk type, a solid state disk (SSD) type, a silicon disk drive (SDD) type, a multimedia card micro type and a card-type (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Next, the network connector 42, which is a module for connecting to a vehicle network, provides a network connection interface. In the instant case, the vehicle network may include a controller area network (CAN), a local interconnect network (LIN), FlexRay, a media oriented systems transport (MOST), and the like.

Next, the communication device 43 is a module for providing an interface for communication with a following vehicle. Various communication schemes such as a vehicle-to-vehicle communication scheme and the like may be applied to the communication device 43.

The controller 44 may perform overall control so that each component may perform the function normally. The controller 44 may be implemented by hardware or software and combination thereof, but the exemplary embodiment of the present invention is not limited thereto. The controller 44 may be implemented with a microprocessor, but the exemplary embodiment is not limited thereto. The controller 44 may be applied to a body control module (BCM).

The controller 44 connects to the vehicle network through the network connector 42 and collects various lamp control information. In the instant case, the lamp control information may include a turn signal on/off command, a head lamp on/off command, a head lamp high-beam command, a head lamp low-beam command, a fog lamp on/off command, a brake lamp on/off command, and the like.

The controller 44 may collectively control the lamps of the host vehicle (leading vehicle) and the following vehicles based on the collected lamp control information.

Figure 5:
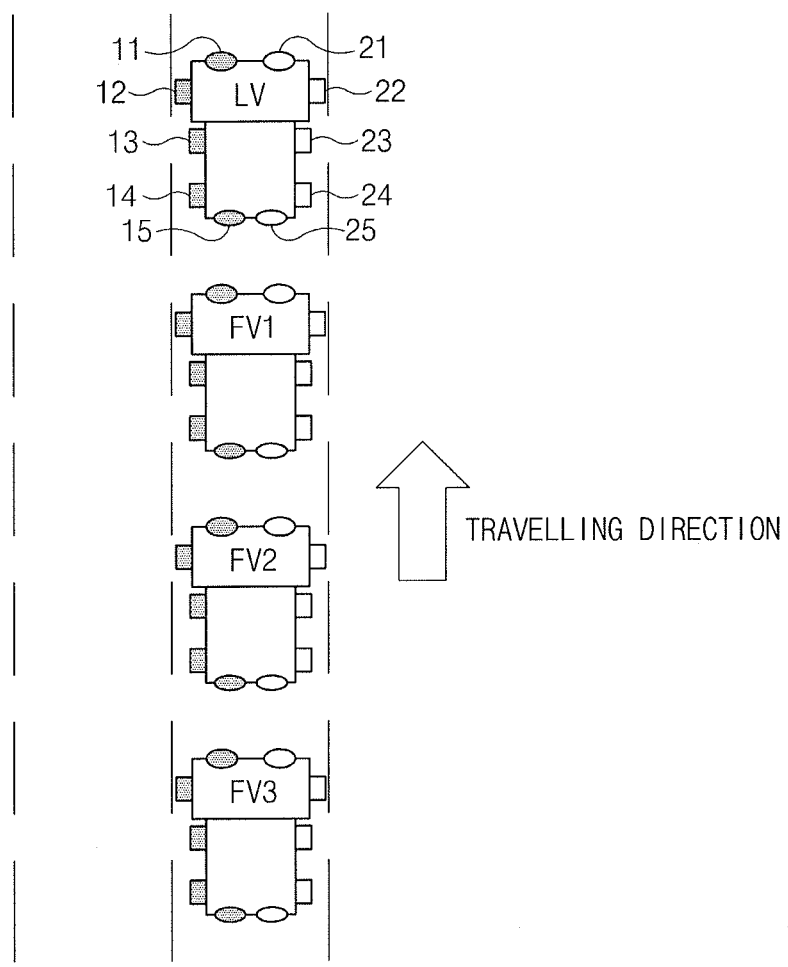
FIG. 5 is a diagram illustrating a scheme of controlling a lamp of a platooning vehicle according to an exemplary embodiment of the present invention.

As one exemplary embodiment of the present invention, when the collected lamp control information is a left turn signal on command, as illustrated in FIG. 5, the controller 44 activates the left positioning lamps (the left front turn signal lamp 11, the left first marker lamp 12, the left second marker lamp 13, the left third marker lamp 14, and the left rear turn signal lamp 15). In the instant case, each of the activated lamps 11 to 15 basically performs a flickering operation.

The control device 44 can synchronize the flickering cycle of each lamp to enhance the platooning recognition effect of the surrounding vehicle drivers. That is, each lamp may be controlled such that all the lamps 11 to 15 are turned on and off at the same time. Furthermore, the controller 44 may sequentially turn on the lamps 11 to 15 and turn off the lamps in the reverse sequence. For example, it may be implemented that the lamps are turned on in order of 11→12→13→14→15 and turned off in order of 15→14→13→12→11.

In more detail, the lamps of the leading vehicle LV, the lamps of FV1, the lamps of FV2, and the lamps of FV3 may be sequentially turned on or off in the reverse order. In the instant case, although only three vehicles are mentioned for understanding, the number of the following vehicles has no effect on the embodiment.

Figure 6:
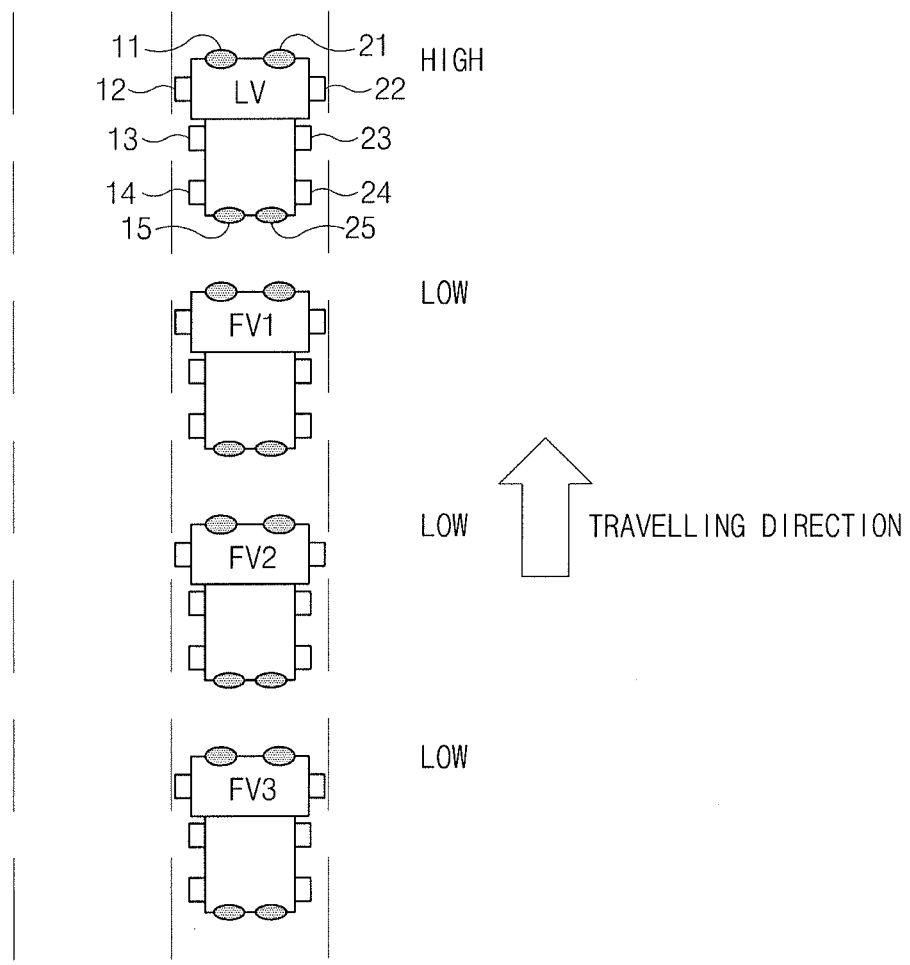
FIG. 6 is a diagram illustrating a scheme of controlling a lamp of a platooning vehicle according to another exemplary embodiment of the present invention.

As another example, as illustrated FIG. 6, when the collected lamp control information is the head lamp high-beam command, preferably, only the head lamps of the host vehicle (leading vehicle) are controlled to be in a high beam and the head lamps of the following vehicles FV1, FV2 and FV3 are not controlled.

Meanwhile, the controller 44 may collectively control the lamps of the leading vehicle LV and the lamps of the following vehicles FV1, FV2 and FV3 corresponding to various events occurring in the following vehicles during the platooning. That is, the controller 44 may perform lamp control in a response to the requests from each of the following vehicles FV1, FV2, and FV3 through the communication device 43.

Hereinafter, a scheme of collectively controlling the lamps of the leading vehicle LV and the following vehicles FV1 to FV3 corresponding to various events by the controller 44 will be described more specifically with reference to FIG. 7, FIG. 8, FIG. 9, FIG. 10, and FIG. 11.

1) Case where New Vehicle Participates in Platooning at Rear of Vehicle Queue

Figure 7:
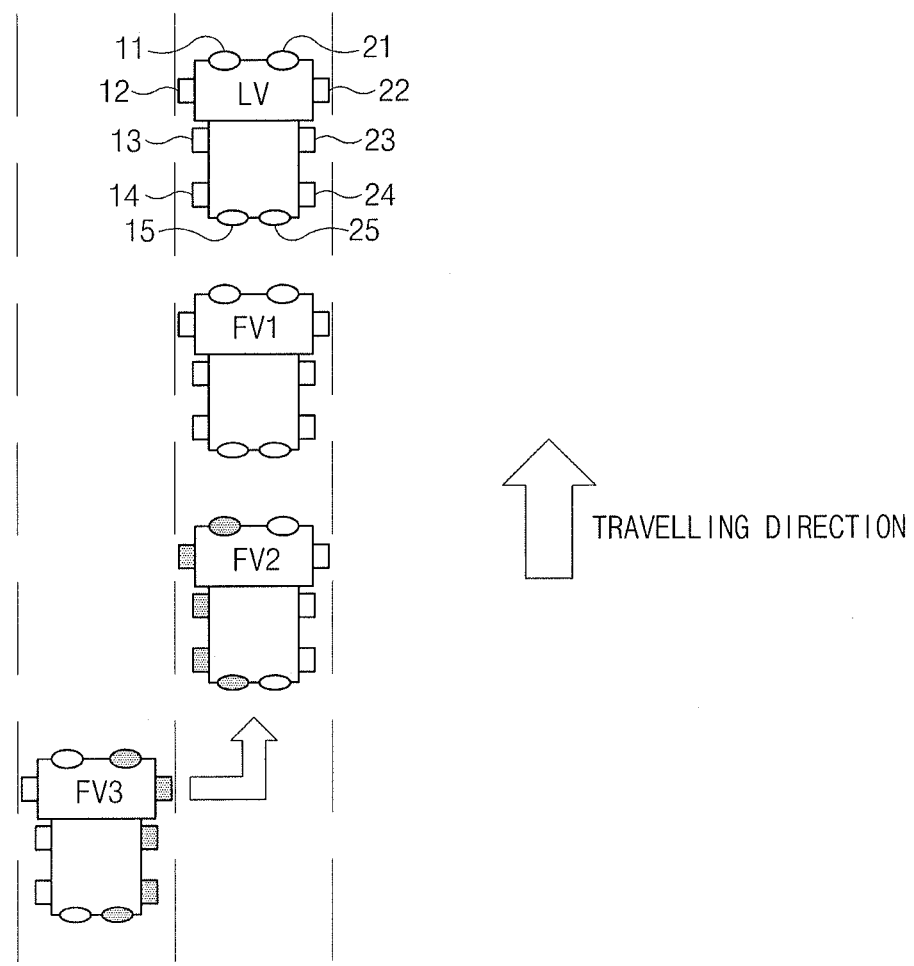
FIG. 7, FIG. 8, FIG. 9, FIG. 10, and FIG. 11 are diagrams illustrating a scheme of controlling a lamp corresponding to various events by a lamp control device of a platooning vehicle according to an exemplary embodiment of the present invention.

As illustrated in FIG. 7, the controller 44 activates one side lamp of the following vehicle FV2 located at the rearmost end portion among the platooning vehicles (the vehicles in the dotted line). In the instant case, since the new vehicle FV3 is entering from the left side of the platooning queue, the left lamp of the following vehicle FV2 is activated. That is, the controller 44 transmits the activation signal of the left lamp to the following vehicle FV2 through the communication device 43. In the instant case, the activation signal may include synchronization information.

Figure 8:
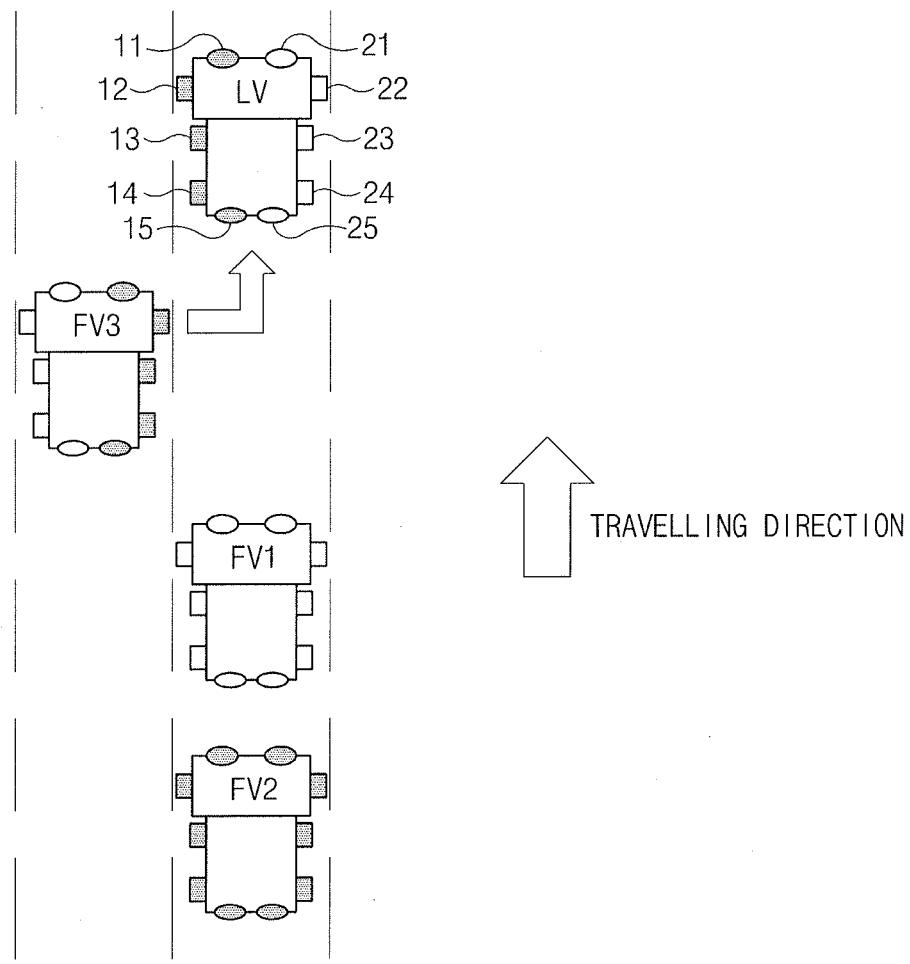

2) Case where New Vehicle Participates in Platooning at Middle of Platooning Queue As illustrated in FIG. 8, the controller 44 activates one side lamp of the leading vehicle LV when the new vehicle FV3 participates in the platooning behind the leading vehicle LV. In the instant case, since the new vehicle FV3 enters from the left side of the platooning queue, the controller 44 activates the left side lamps of the leading vehicle LV (the left front turn signal lamp 11, the left first marker lamp 12, the left second marker lamp 13, the left third marker lamp 14, and the left rear turn signal lamp 15). When the new vehicle FV3 enters from the right side of the platooning queue, the controller 44 activates the right side lamps of the leading vehicle LV (the right front turn signal lamp 21, the right first marker lamp 22, the right second marker lamp 23, the right third marker lamp 24, and the right rear turn signal lamp 25).

Furthermore, the controller 44 activates all the lamps (left and right lamps) of the following vehicle FV2 placed at the rearmost end portion of the platooning queue. As mentioned above, all the lamps perform the flickering operation. In the instant case, the flickering operations may be synchronized with each other.

3) Case where Following Vehicle Leaves Platooning Queue During Platooning.

Figure 9:
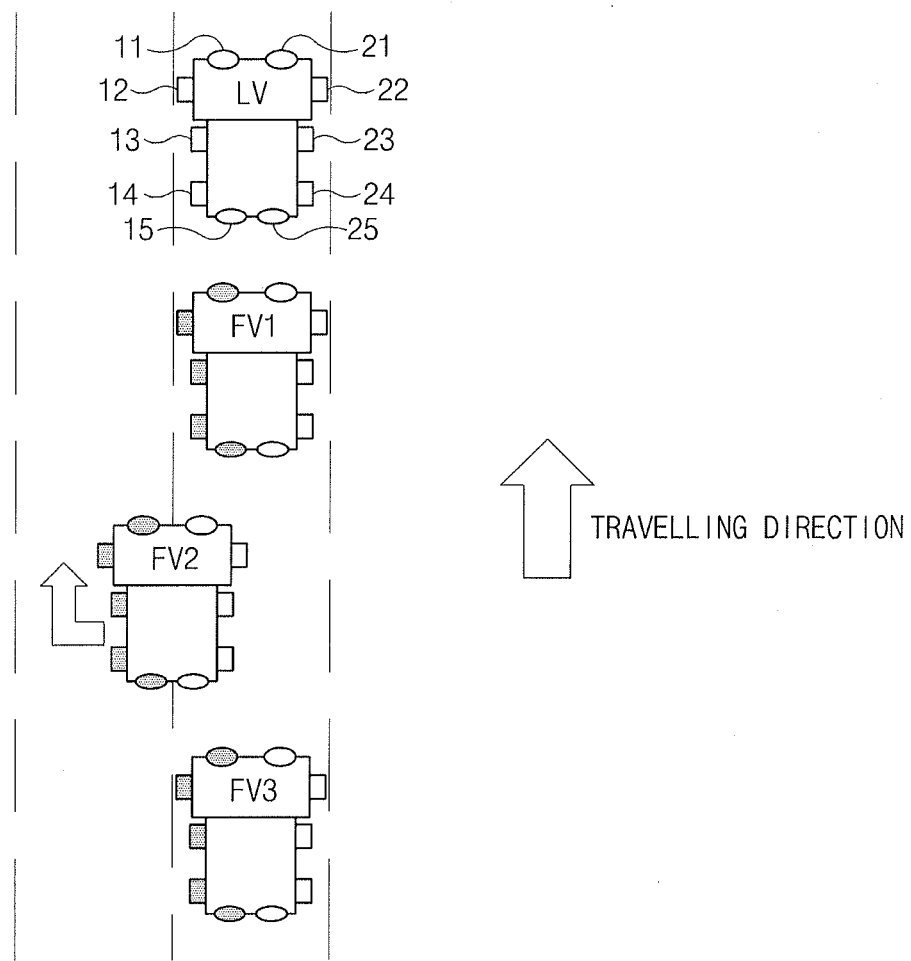

As illustrated in FIG. 9, when the following vehicle FV2 leaves the platooning queue, the controller 44 activates one-side lamps of the following vehicles FV1 and FV3 positioned before and after the following vehicle FV2. In the instant case, since the following FV2 leaves the platooning queue to the left side of the platooning queue, the left lamps of the following vehicles FV1 and FV3 are activated. The controller 44 may control such that the flickering of the lamps of the following vehicles FV1 and FV3 are synchronized with each other. The controller 44 may control such that the flickering period of the lamps of the following vehicles FV1 and FV3 is faster or slower than that of the lamp of the following vehicle FV2.

Furthermore, when the following vehicle FV2 leaves the platooning queue to the right side of the platooning queue, the controller 44 activates the right lamps of the following vehicles FV1 and FV3.

4) Case where External Vehicle Attempts to Enter Platooning Queue

Figure 10:
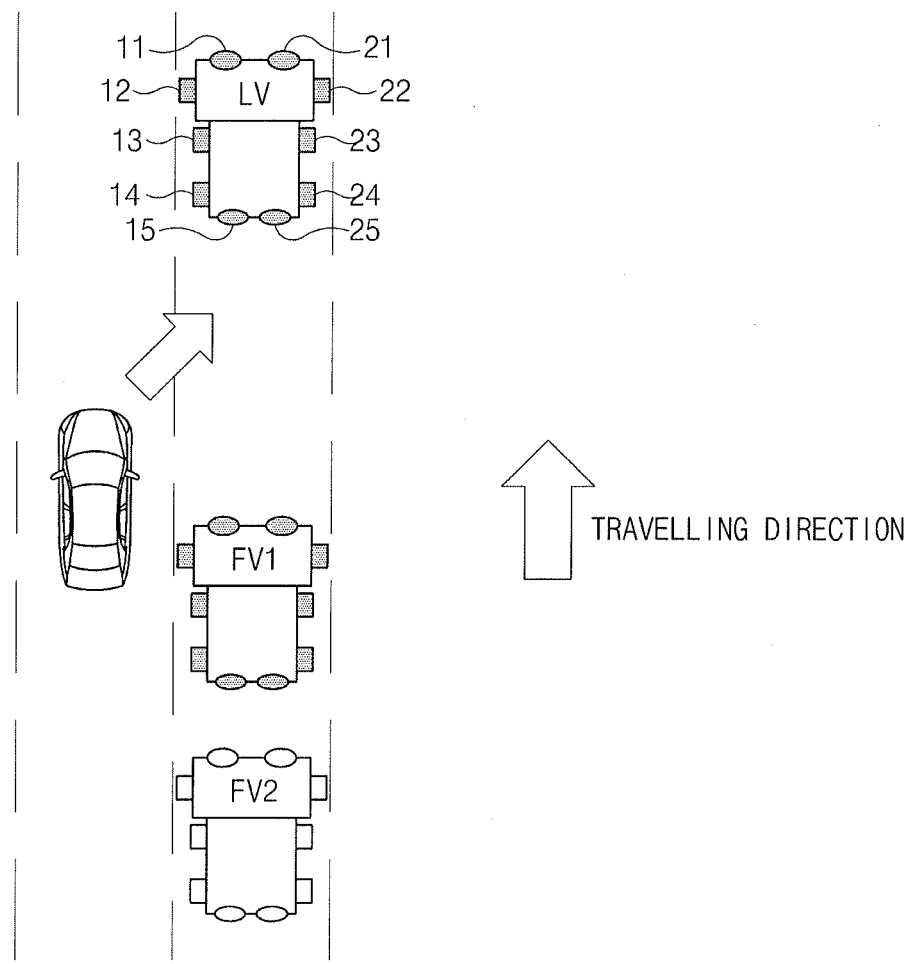

As illustrated in FIG. 10, when an external vehicle which is not normally authenticated attempts to enter the platooning queue, that is, the external vehicle attempts to enter between the leading vehicle LV and the following vehicle FV1, the controller 44 activates all the lamps 11 to 15 and 21 to 25 of the leading vehicle LV and all the lamps of the following vehicle FV1, such that the driver of the external vehicle recognizes that the external vehicle is entering the platooning queue. In the instant case, the controller 44 may further control such that the leading vehicle and following vehicles LV and FV1 sound horns.

5) Case where Following Vehicle FV2 is to Change Order in Platooning Queue

Figure 11:
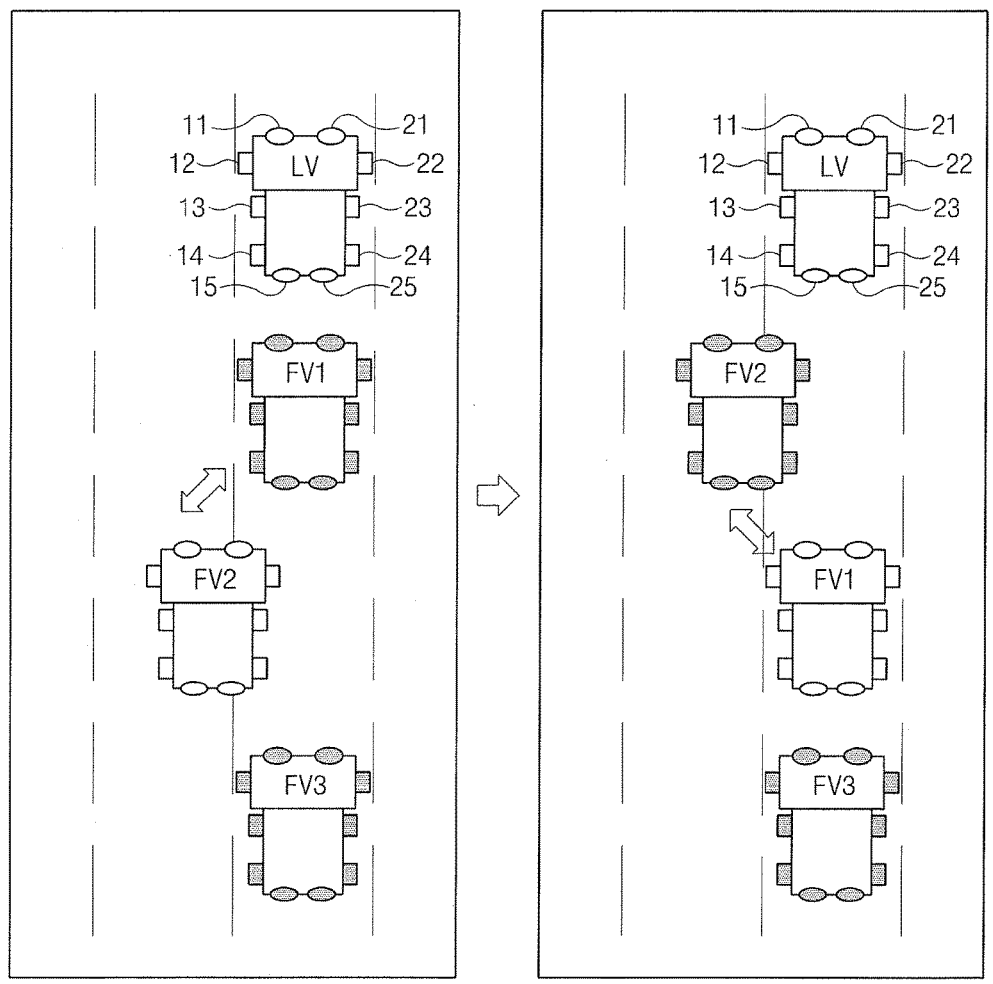

As illustrated in FIG. 11, when the following vehicle FV2 is to change its position with the following vehicle FV1, that is, the following vehicle FV2 moves to the left lane of the platooning queue and enters into a space generated by decreasing the speed of the following vehicle FV1, the controller 44 activates all the lamps of the following vehicles FV1 and FV3 while the following vehicle FV2 leaves the platooning queue. Thereafter, the controller 44 inactivates all the lamps of the following vehicle FV1 and activates all the lamps of FV2 and FV3 while the following vehicle FV2 enters the platooning queue. The integrated control of lamps may ensure the stability in performing various events that occur in platooning.

Figure 12:
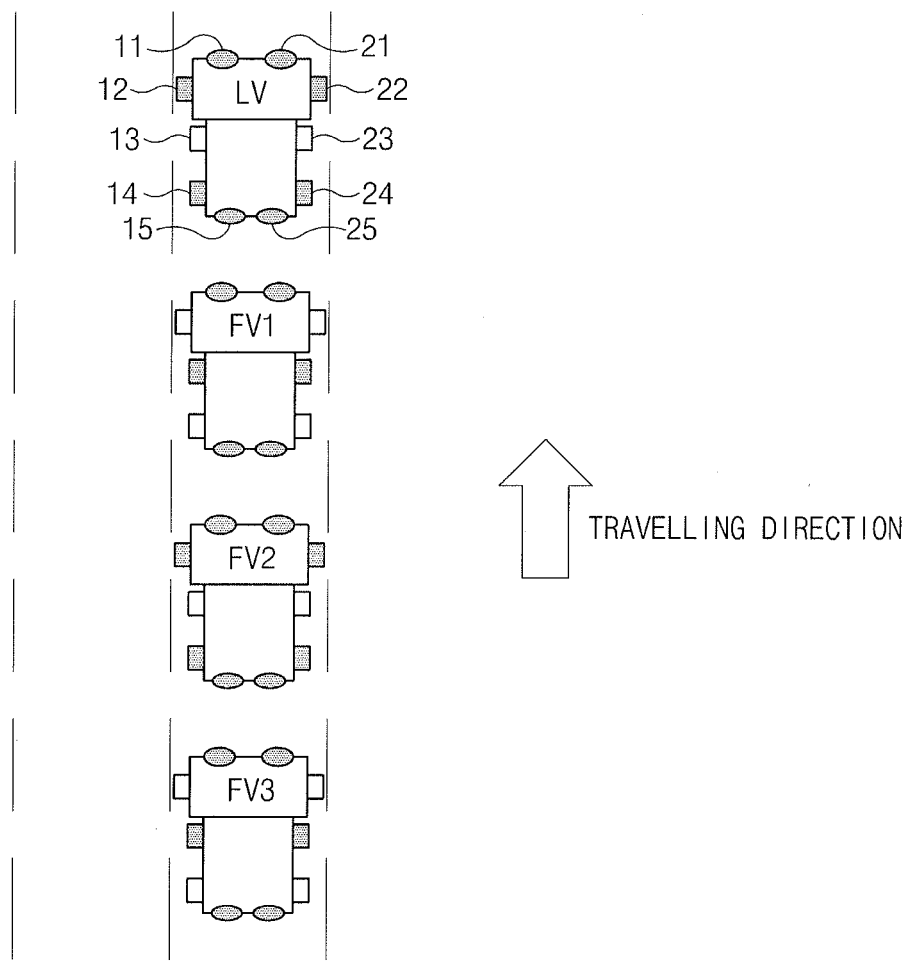
FIG. 12 is a diagram illustrating a scheme of collectively controlling a lamp when platooning is released by a lamp control device of a platooning vehicle according to an exemplary embodiment of the present invention.

Meanwhile, as illustrated FIG. 12, to inform of the releasing of the platooning queue, the controller 44 may activate the left and right front/rear turn signal lamps of the leading vehicle and following vehicles LV and FV1 to FV3 and may control such that the side marker lamps of the leading vehicle and following vehicles LV and FV1 to FV3 flicker alternately. For example, when the left/right first marker lamps and the left/right third marker lamps are turned on, the left/right second marker lamps may be turned off. Furthermore, the following vehicles FV1 and FV3 may be controlled in a manner opposite to that of the leading vehicle LV and the following vehicle FV2 may be controlled in the same manner as the leading vehicle LV.

Figure 13:
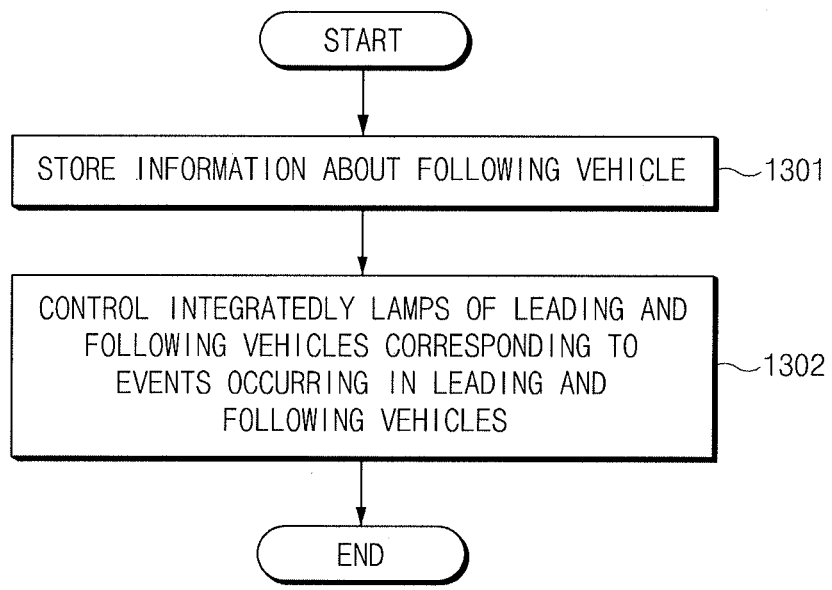
FIG. 13 is a flowchart illustrating a method of controlling a lamp of a platooning vehicle according to an exemplary embodiment of the present invention.

FIG. 13 is a flowchart illustrating a method of controlling a lamp of a platooning vehicle according to an exemplary embodiment of the present invention, and shows a process of controlling lamps of platooning vehicles including a leading vehicle and a plurality of following vehicles.

First, in operation 1301, the memory 41 stores the information related to the following vehicle.

As such, in operation 1302, the controller 44 collectively controls the lamps of the leading vehicle and following vehicles corresponding to events occurring in the leading vehicle and following vehicles.

Figure 14:
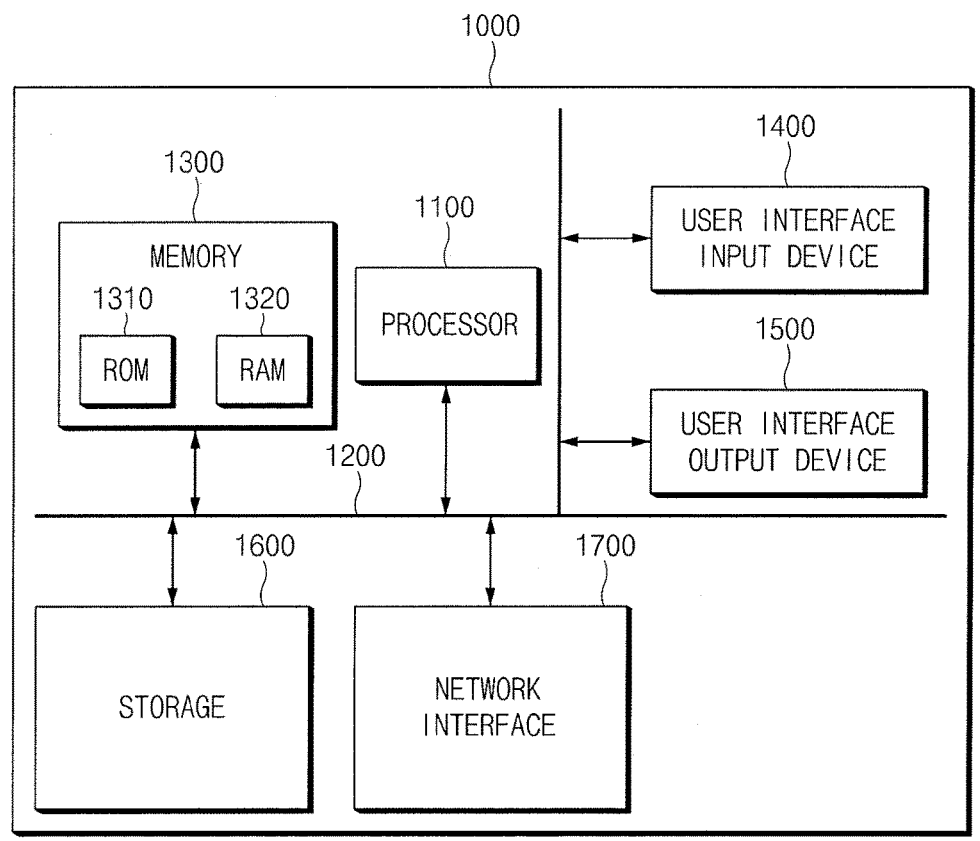
FIG. 14 is a block diagram illustrating a computing system for executing a method of controlling a lamp of a platooning vehicle according to an exemplary embodiment of the present invention.

FIG. 14 is a block diagram illustrating a computing system for executing a method of controlling a lamp of a platooning vehicle according to an exemplary embodiment of the present invention.

Referring to FIG. 14, a method of controlling a lamp of a platooning vehicle according to an exemplary embodiment of the present invention may be implemented with a computing system. The computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the processes of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to an exemplary embodiment of the present invention, drivers of surrounding vehicles may effectively recognize all events that occur during platooning by collectively controlling lamps of leading and following vehicles corresponding to various events occurring in the following vehicle during platooning.

Furthermore, according to an exemplary embodiment of the present invention, the lamps of the leading vehicle and following vehicles are collectively controlled corresponding to various events occurring in the following vehicle during platooning, so that the lamps may be controlled for all cases occurring during platooning (a case where the following vehicle normally leaves the platooning, a case where a new following vehicle participates in the platooning, a case where the positions of the following vehicles are changed with each other, etc.).

Furthermore, according to an exemplary embodiment of the present invention, the lamps of the leading vehicle and following vehicles may be collectively controlled corresponding to various events occurring in the following vehicles during platooning so that the utilization of the lamps is improved.

The above description is a simple exemplification of the technical spirit of the present invention, and the present invention may be variously corrected and modified by those skilled in the art to which the present invention pertains without departing from the essential features of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling lamps of platooning vehicles including a leading vehicle and a plurality of following vehicles, the apparatus comprising:
   a memory configured to store information related to the following vehicles; and
   a controller configured to collectively control lamps of the leading vehicle and following vehicles in a response to events occurring in the leading vehicle and following vehicles.

2. The apparatus of claim 1, wherein each of the platooning vehicles includes: a front turn signal lamp, a rear turn signal lamp and a plurality of side marker lamps.

3. The apparatus of claim 2, wherein the controller is configured to activate the turn signal lamps and side marker lamps of the leading vehicle and the turn signal lamps and marker side lamps of each of the following vehicle in a response to a turn signal ON command generated in the leading vehicle, and controls such that the lamps flicker synchronously.

4. The apparatus of claim 3, wherein the controller synchronizes a flicker of a left turn signal lamp with a flicker of a left marker lamp of the leading vehicle when the turn signal ON command is a left turn signal ON command and synchronizes a flicker of a right turn signal lamp with a flicker of a right marker lamp of the leading vehicle when the turn signal ON command is a right turn signal ON command.

5. The apparatus of claim 2, wherein the controller is configured to activate a turn signal lamp and a plurality of side marker lamps of a rearmost following vehicle in a platooning queue when a new vehicle participates in the platooning queue at rear of the platooning queue.

6. The apparatus of claim 5, wherein the controller is configured to activate a left turn signal lamp and a left marker lamp of the rearmost following vehicle when the new vehicle enters from a left side of the platooning queue, and activates a right turn signal lamp and a right marker lamp of the rearmost following vehicle when the new vehicle enters from a right side of the platooning queue.

7. The apparatus of claim 2, wherein the controller is configured to activate a turn signal lamp and a plurality of side marker lamps of a vehicle preceding a new vehicle and a turn signal lamp and a plurality of side marker lamps of a rearmost following vehicle in a platooning queue when the new vehicle participates in the platooning queue at a middle of the platooning queue.

8. The apparatus of claim 7, wherein the controller is configured to activate a left turn signal lamp and a left marker lamp of the preceding vehicle and all lamps of the rearmost following vehicle when the new vehicle enters from a left side of the platooning queue, and activates a right turn signal lamp and a right marker lamp of the preceding vehicle and all the lamps of the rearmost following vehicle when the new vehicle enters from a right side of the platooning queue.

9. The apparatus of claim 2, wherein the controller is configured to activate a turn signal lamp and a plurality of side marker lamps of a vehicle of the platooning vehicles adjacent to a following vehicle platooning in a platooning queue when the following vehicle leaves the platooning queue.

10. The apparatus of claim 9, wherein the controller is configured to activate a left turn signal lamp and a left maker lamp of the adjacent vehicle when the following vehicle leaves the platooning queue to a left side of the platooning queue, and activates a right turn signal lamp and a right maker lamp of the adjacent vehicle when the following vehicle leaves the platooning queue to a right side of the platooning queue.

11. The apparatus of claim 10, wherein the controller is configured to set a lamp flickering period of the adjacent vehicle to be longer than a lamp flickering period of the following vehicle.

12. The apparatus of claim 2, wherein the controller is configured to activate all lamps of a vehicle of platooning vehicles adjacent to an external vehicle which is not normally authenticated when the external vehicle attempts to enter a platooning queue.

13. The apparatus of claim 12, wherein the controller is configured to control such that the adjacent vehicle sounds a horn.

14. The apparatus of claim 2, wherein the controller is configured to activate all lamps of a vehicle adjacent to a following vehicle while the following vehicle leaves a platooning queue and activates all lamps of the following vehicle and a rearmost following vehicle in the platooning queue while the following enters the platooning queue when the following vehicle is to change an order in the platooning queue.

15. The apparatus of claim 2, wherein the controller is configured to activate the turn signal lamp of the leading vehicle and the turn signal lamp of each following vehicle and controls such that the side marker lamp of the leading vehicle and the side marker lamp of each following vehicle flicker alternately when informing of release of platooning.

16. A method of controlling lamps of platooning vehicles including a leading vehicle and a plurality of following vehicles, the method comprising:
  storing information related to the following vehicles; and
  collectively controlling lamps of the leading vehicle and following vehicles in a response to events occurring in the leading vehicle and following vehicles.

17. The method of claim 16, wherein the controlling of the lamps of the leading vehicle and following vehicles includes activating the turn signal lamps and side marker lamps of the leading vehicle and the turn signal lamps and marker side lamps of each of the following vehicle in a response to a turn signal ON command generated in the leading vehicle, and controlling such that the lamps flicker synchronously.

18. The method of claim 16, wherein the controlling of the lamps of the leading vehicle and following vehicles includes activating a turn signal lamp and a plurality of side marker lamps of a rearmost following vehicle in a platooning queue when a new vehicle participates in the platooning queue at rear of the platooning queue.

19. The method of claim 16, wherein the controlling of the lamps of the leading vehicle and following vehicles includes activating a turn signal lamp and a plurality of side marker lamps of a vehicle of the platooning vehicles preceding a new vehicle and a turn signal lamp and a plurality of side marker lamps of a rearmost following vehicle of the platooning vehicles in a platooning queue when the new vehicle participates in the platooning queue at a middle of the platooning queue.

20. The method of claim 16, wherein the controlling of the lamps of the leading vehicle and following vehicles includes activating a turn signal lamp and a plurality of side marker lamps of a vehicle of the platooning vehicles adjacent to a following vehicle platooning in a platooning queue when the following vehicle leaves the platooning queue.

* * * * *